United States Patent
Fukushima et al.

(10) Patent No.: US 11,203,655 B2
(45) Date of Patent: Dec. 21, 2021

(54) POLYMER COMPOUND, LIQUID CRYSTAL COMPOSITION, PHASE DIFFERENCE LAYER, OPTICAL FILM, POLARIZING PLATE, AND IMAGE DISPLAY DEVICE

(71) Applicant: FUJIFILM Corporation, Tokyo (JP)

(72) Inventors: Yuki Fukushima, Kanagawa (JP); Shunya Katoh, Kanagawa (JP); Koji Iijima, Kanagawa (JP); Shuhei Okuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 16/843,242

(22) Filed: Apr. 8, 2020

(65) Prior Publication Data
US 2020/0231727 A1 Jul. 23, 2020

Related U.S. Application Data
(63) Continuation of application No. PCT/JP2018/039641, filed on Oct. 25, 2018.

(30) Foreign Application Priority Data
Oct. 27, 2017 (JP) .............................. JP2017-208277

(51) Int. Cl.
| | | |
|---|---|---|
| C08F 220/28 | (2006.01) | |
| C09K 19/56 | (2006.01) | |
| G02B 5/30 | (2006.01) | |
| C09K 19/54 | (2006.01) | |
| G02F 1/1335 | (2006.01) | |
| G02F 1/13363 | (2006.01) | |
| C09K 19/04 | (2006.01) | |

(52) U.S. Cl.
CPC .......... *C08F 220/283* (2020.02); *C09K 19/54* (2013.01); *C09K 19/56* (2013.01); *G02B 5/3016* (2013.01); *G02B 5/3083* (2013.01); *G02F 1/1335* (2013.01); *G02F 1/13363* (2013.01); *C09K 2019/0448* (2013.01); *C09K 2323/03* (2020.08); *C09K 2323/031* (2020.08)

(58) Field of Classification Search
CPC . C08F 220/283; G02B 5/3016; G02B 5/3083; C09K 19/56; C09K 19/54; C09K 2019/0448; C09K 2323/00; C09K 2323/03; C09K 2323/031; G02F 1/13363; G02F 1/1335
USPC ............... 428/1.1, 1.2, 1.3, 1.31; 252/299.01
See application file for complete search history.

(56) References Cited

U.S. PATENT DOCUMENTS

| | | |
|---|---|---|
| 2006/0115608 A1 | 6/2006 | Saito et al. |
| 2006/0127603 A1 | 6/2006 | Kim et al. |
| 2007/0098920 A1* | 5/2007 | Yamamoto ............ C08F 220/38 428/1.1 |

(Continued)

FOREIGN PATENT DOCUMENTS

| | | |
|---|---|---|
| CN | 1782752 A | 6/2006 |
| CN | 102967894 A | 3/2013 |

(Continued)

OTHER PUBLICATIONS
International Search Report issued in PCT/JP2018/039641 dated Nov. 27, 2018.

(Continued)

*Primary Examiner* — Ruiyun Zhang
(74) *Attorney, Agent, or Firm* — Edwards Neils LLC; Jean C. Edwards, Esq.

(57) ABSTRACT

An object of the present invention is to provide a polymer compound which can form a phase difference layer having high alignment and suppressed surface unevenness by being blended into a liquid crystal composition, and a liquid crystal composition, a phase difference layer, an optical film, a polarizing plate, and an image display device using the same. The polymer compound of the present invention includes a repeating unit represented by Formula (I), a repeating unit represented by Formula (II), and a repeating unit represented by Formula (III), in which an acid value is 115 mgKOH/g or more, and a hydroxyl value is 70 mgKOH/g or more.

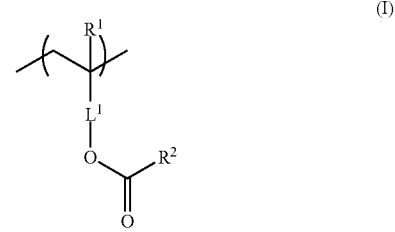

(I)

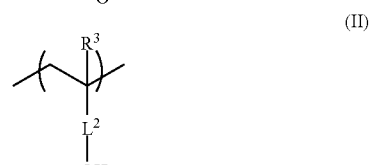

(II)

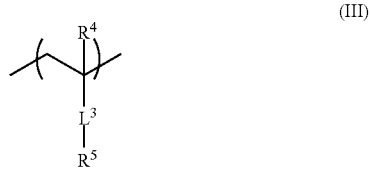

(III)

20 Claims, No Drawings

(56) References Cited

U.S. PATENT DOCUMENTS

| | | | | |
|---|---|---|---|---|
| 2010/0216363 A1* | 8/2010 | Kubota | ............... | D06M 15/263 442/93 |
| 2015/0277006 A1 | 10/2015 | Takasago et al. | | |
| 2015/0323824 A1 | 11/2015 | Hisakado et al. | | |
| 2016/0154303 A1 | 6/2016 | Itou et al. | | |
| 2017/0047555 A1* | 2/2017 | Ishiguro | ............. | H01L 51/5293 |

FOREIGN PATENT DOCUMENTS

| | | | |
|---|---|---|---|
| CN | 104937455 | A | 9/2015 |
| CN | 104950371 | A | 9/2015 |
| CN | 105358628 | A | 2/2016 |
| JP | 2004-287299 | A | 10/2004 |
| JP | 2004-287364 | A | 10/2004 |
| JP | 2008-523443 | A | 7/2008 |
| JP | 2015-071743 | A | 4/2015 |
| JP | 2017-065241 | A | 4/2017 |

OTHER PUBLICATIONS

Written Opinion issued in PCT/JP2018/039641 dated Nov. 27, 2018.

International Preliminary Report on Patentability completed by WIPO dated Apr. 28, 2020 in connection with International Patent Application No. PCT/JP2018/039641.

Office Action, issued by the Japanese Patent Office dated Apr. 27, 2021, in connection with Japanese Patent Application No. 2019-551232.

Office Action, issued by the State Intellectual Property Office dated Jul. 16, 2021, in connection with Chinese Patent Application No. 201880069359.0.

* cited by examiner

POLYMER COMPOUND, LIQUID CRYSTAL COMPOSITION, PHASE DIFFERENCE LAYER, OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2018/039641 filed on Oct. 25, 2018, which was published under Article 21(2) in Japanese, and which claims priority under 35 U.S.C. § 119(a) to Japanese Patent Application No. 2017-208277 filed on Oct. 27, 2017. The above applications are hereby expressly incorporated by reference, in their entirety, into the present application.

BACKGROUND OF THE INVENTION

1. Field of the Invention

The present invention relates to a polymer compound, a liquid crystal composition, a phase difference layer, an optical film, a polarizing plate, and an image display device.

2. Description of the Related Art

A phase difference film is generally used for a liquid crystal display device.

Here, as a method of producing the phase difference film, it is known that a phase difference layer is formed after an alignment film is formed on a substrate by performing an alignment treatment.

In addition, in recent years, from the viewpoint of reducing the thickness and the like of the liquid crystal display device, a method of forming the phase difference layer on the substrate without interposing the alignment film is also known.

For example, JP2008-523443A discloses, as a homeotropic alignment liquid crystal film which does not require an alignment film, a homeotropic alignment liquid crystal film produced by a method of producing a homeotropic alignment liquid crystal film including a step of directly coating a plastic substrate which has a surface subjected to a hydrophilic treatment with a polymerizable and reactive liquid crystal mixture solution including a surfactant ([claim 1] and [claim 10]).

SUMMARY OF THE INVENTION

The present inventors have conducted investigations on the film disclosed in JP2008-523443A, and have found that, in a case where the film is used as the phase difference layer, alignment is insufficient and surface unevenness may occur.

An object of the present invention is to provide a polymer compound which can form a phase difference layer having high alignment and suppressed surface unevenness by being blended into a liquid crystal composition, and a liquid crystal composition, a phase difference layer, an optical film, a polarizing plate, and an image display device using the same.

As a result of intensive investigations to achieve the object, the present inventors have found that, by blending a polymer compound which has a specific repeating unit and satisfies a predetermined acid value and hydroxyl value into a liquid crystal composition before alignment state of a liquid crystalline compound is fixed, the phase difference layer having high alignment and suppressed surface unevenness can be formed, and thus have completed the present invention.

That is, it has been found that the above object can be achieved by adopting the following configurations.

[1] A polymer compound comprising:
a repeating unit represented by Formula (I) described later;
a repeating unit represented by Formula (II) described later; and
a repeating unit represented by Formula (III) described later,
in which an acid value is 115 mgKOH/g or more, and a hydroxyl value is 70 mgKOH/g or more.

[2] The polymer compound according to [1],
in which the polymer compound is an acrylic or methacrylic polymer.

[3] The polymer compound according to [1] or [2],
in which the repeating unit represented by Formula (I) described later has an acetoacetyl group.

[4] The polymer compound according to any one of [1] to [3],
in which the repeating unit represented by Formula (I) described later is a repeating unit represented by Formula (IV) described later.

[5] The polymer compound according to arty one of [1] to [4],
in which $L^2$ in Formula (II) described later is a divalent linking group selected from the group consisting of —C(=O)—, —(C=O)O—, a divalent aliphatic group which may have a substituent, and a combination of these groups.

[6] The polymer compound according to any one of [1] to [5],
in which $L^2$ in Formula (II) described later is a divalent linking group which includes a divalent aliphatic group having a hydroxyl group.

[7] The polymer compound according to any one of [1] to [6],
in which the repeating unit represented by Formula (III) described later is a repeating unit represented by Formula (V) described later.

[8] The polymer compound according to any one of [1] to [7],
in which the acid value is 125 mgKOH/g or more, and the hydroxyl value is 90 mgKOH/g or more.

[9] The polymer compound according to any one of [1] to [8], further comprising:
a repeating unit represented by Formula (VI) described later.

[10] The polymer compound according to any one of [1] to [9],
in which a content of the repeating unit represented by Formula (III) described later is 30% by mass or less with respect to all the repeating units of the polymer compound.

[11] The polymer compound according to any one of [1] to [10],
in which a weight-average molecular weight is 5,000 to 500,000.

[12] A liquid crystal composition comprising:
the polymer compound according to any one of [1] to [11]; and
a liquid crystalline compound having a polymerizable group.

[13] The liquid crystal composition according to [12], further comprising:
a vertical alignment agent.

[14] A phase difference layer formed of the liquid crystal composition according to [12] or [13].
[15] An optical film comprising:
the phase difference layer according to [14].
[16] A polarizing plate comprising:
the optical film according to [15].
[17] The polarizing plate according to [16], further comprising:
a polarizer.
[18] An image display device comprising:
the optical film according to [15]; or
the polarizing plate according to [16] or [17].

According to the present invention, it is possible to provide a polymer compound which can form a phase difference layer having high alignment and suppressed surface unevenness by being blended into a liquid crystal composition, and a liquid crystal composition, a phase difference layer, an optical film, a polarizing plate, and an image display device using the same.

DESCRIPTION OF THE PREFERRED EMBODIMENTS

Hereinafter, the present invention will be described in detail.

The description of the constitutional requirements described below is made on the basis of representative embodiments of the present invention, but it should not be construed that the present invention is limited to those embodiments.

In this specification, numerical value ranges expressed by the term "to" mean that the numerical values described before and after "to" are included as a lower limit value and an upper limit value, respectively.

[Polymer Compound]

The polymer compound according to an embodiment of the present invention has a repeating unit (hereinafter, also abbreviated as a "repeating unit (I)") represented by Formula (I), a repeating unit (hereinafter, also abbreviated as a "repeating unit (II)") represented by Formula (II), and a repeating unit (hereinafter, also abbreviated as a "repeating unit (III)") represented by Formula (III).

In addition, the polymer compound according to the embodiment of the present invention has an acid value of 115 mgKOH/g or more and a hydroxyl value of 70 mgKOH/g or more.

Here, the acid value represents the number of milligrams of an amount of potassium hydroxide, which is required to neutralize acid group (for example, a carboxy group, a sulfonic acid group, an activated methylene group, and the like) contained in 1 g of a polymer compound, and is a value measured by a potentiometric titration (JIS K 0070:1992).

In addition, the hydroxyl value represents the number of milligrams of an amount of potassium hydroxide, which is required to neutralize acetic acid bonded to a hydroxyl group in a case of acetylating 1 g of a polymer compound, and is a value measured by a potentiometric titration (JIS K 0070:1992).

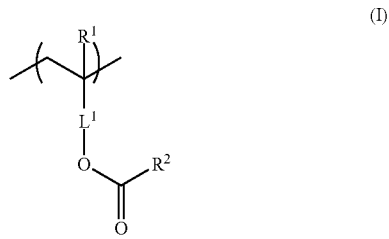

(I)

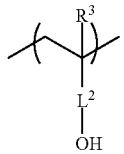

(II)

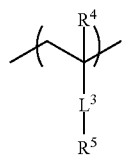

(III)

In Formulae (I) to (III), $R^1$, $R^3$, and $R^4$ each independently represent a hydrogen atom or a methyl group, and $L^1$, $L^2$, and $L^3$ each independently represent a single bond, or a divalent linking group selected from the group consisting of —O—, —C(=O)—, —(C=O)O—, —(C=O)NR$^6$—, a divalent aliphatic group which may have a substituent, a divalent aromatic group which may have a substituent, and a combination of these groups. $R^6$ represents a hydrogen atom or an alkyl group having 1 to 20 carbon atoms.

In addition, in Formula (I), $R^2$ represents an alkyl group having 1 to 20 carbon atoms. In a case where $R^2$ is an alkyl group having 2 to 20 carbon atoms, one or more of —CH$_2$— constituting the alkyl group may be substituted with —COO— or —CO—.

In addition, in Formula (III), $R^5$ represents an alkyl group having 4 to 20 carbon atoms, in which at least one hydrogen atom is substituted with a fluorine atom.

In the present invention, as described above, by blending the polymer compound according to the embodiment of the present invention into a liquid crystal composition before alignment state of a liquid crystalline compound is fixed, a phase difference layer having high alignment and suppressed surface unevenness can be formed.

Although the reason is not clear in detail, the present inventors assume as follows.

That is, the present inventors assumes that, in the polymer compound according to the embodiment of the present invention, the repeating unit (I) imparts a function of unevenly distributing the polymer compound to the substrate side, the repeating unit (II) causes vertical alignment of the liquid crystalline compound, and the repeating unit (III) suppresses the occurrence of surface unevenness.

In addition, since the polymer compound according to the embodiment of the present invention has an acid value of 115 mgKOH/g or more and a hydroxyl value of 70 mgKOH/g or more, it is assumed that the polymer compound is composed of such that the act of each repeating unit can be exhibited simultaneously.

[Repeating Unit (I)]

The repeating unit (I) included in the polymer compound according to the embodiment of the present invention is a repeating unit represented by Formula (I).

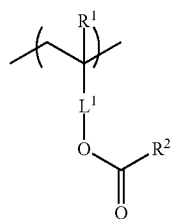

(I)

In Formula (I), $R^1$ represents a hydrogen atom or a methyl group.

In addition, in Formula (I), $L^1$ represents a single bond, or a divalent linking group selected from the group consisting of —O—, —C(=O)—, —(C=O)O—, —(C=O)$NR^6$—, a divalent aliphatic group which may have a substituent, a divalent aromatic group which may have a substituent, and a combination of these groups. $R^6$ represents a hydrogen atom or an alkyl group having 1 to 20 carbon atoms.

In addition, in Formula (I), $R^2$ represents an alkyl group having 1 to 20 carbon atoms. In a case where $R^2$ is an alkyl group having 2 to 20 carbon atoms, one or more of —$CH_2$— constituting the alkyl group may be substituted with —COO— or —CO—.

Hereinafter, the above-mentioned divalent linking group represented by one aspect of $L^1$ in Formula (I) will be described.

First, in —(C=O)$NR^6$— represented by one aspect of $L^1$ in Formula (I), as described above, $R^6$ represents a hydrogen atom or an alkyl group having 1 to 20 carbon atoms.

Here, the alkyl group having 1 to 20 carbon atoms is, for example, preferably a linear, branched, or cyclic alkyl group having 1 to 18 carbon atoms, more preferably an alkyl group (such as a methyl group, an ethyl group, a propyl group, an isopropyl group, an n-butyl group, an isobutyl group, a sec-butyl group, a t-butyl group, and a cyclohexyl group) having 1 to 8 carbon atoms, even more preferably an alkyl group having 1 to 4 carbon atoms, and particularly preferably a methyl group or an ethyl group.

In addition, in the divalent aliphatic group which may have a substituent and the divalent aromatic group which may have a substituent, which are represented by one aspect of $L^1$ in Formula (I), specific examples of the substituent which may be included include an alkyl group, an alkoxy group, a halogen atom, and a hydroxyl group.

Here, the alkyl group is, for example, preferably a linear, branched, or cyclic alkyl group having 1 to 18 carbon atoms, more preferably an alkyl group (such as a methyl group, an ethyl group, a propyl group, an isopropyl group, an n-butyl group, an isobutyl group, a sec-butyl group, a t-butyl group, and a cyclohexyl group) having 1 to 8 carbon atoms, even more preferably an alkyl group having 1 to 4 carbon atoms, and particularly preferably a methyl group or an ethyl group.

In addition, the alkoxy group is, for example, preferably an alkoxy group having 1 to 18 carbon atoms, more preferably an alkoxy group (such as a methoxy group, an ethoxy group, an n-butoxy group, and a methoxyethoxy group) having 1 to 8 carbon atoms, even more preferably an alkoxy group having 1 to 4 carbon atoms, and particularly preferably a methoxy group or an ethoxy group.

In addition, examples of the halogen atom include a fluorine atom, a chlorine atom, a bromine atom, and an iodine atom. Among these, a fluorine atom or a chlorine atom is preferable.

Examples of the divalent aliphatic group which may have a substituent include a linear, branched, or cyclic alkylene group having 1 to 10 carbon atoms, which may have the above-described substituent.

Here, specific examples of the linear alkylene group include a methylene group, an ethylene group, a propylene group, a butylene group, a pentylene group, a hexylene group, and a decylene group.

In addition, specific examples of the branched alkylene group include a dimethyl ethylene group, a methylethylene group, a 2,2-dimethylpropylene group, and a 2-ethyl-2-methylpropylene group.

In addition, specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group. Among these, a cyclohexylene group is preferable.

In addition, examples of the divalent aromatic group which may have a substituent include an arylene group having 6 to 12 carbon atoms, which may have the above-described substituent.

Here, specific examples of the arylene group having 6 to 12 carbon atoms include a phenylene group, a xylylene group, a biphenylene group, a naphthylene group, and a 2,2'-methylenebisphenyl group. Among these, a phenylene group is preferable.

In the present invention, $L^1$ in Formula (I) is preferably not a single bond but the above-described divalent linking group, more preferably a divalent linking group including —(C=O)O— in a moiety linked to the main chain, and even more preferably a divalent linking group having —(C=O)O— in a moiety linked to the main chain and having a divalent aliphatic group (particularly, a linear alkylene group).

Next, the alkyl group having 1 to 20 carbon atoms represented by $R^2$ in Formula (I) will be described. As described above, in a case where $R^2$ is an alkyl group having 2 to 20 carbon atoms, one or more of —$CH_2$— constituting the alkyl group may be substituted with —COO— or —CO—.

The alkyl group having 1 to 20 carbon atoms represented by $R^2$ in Formula (I) is, for example, preferably a linear, branched, or cyclic alkyl group having 1 to 18 carbon atoms, more preferably an alkyl group (such as a methyl group, an ethyl group, a propyl group, an isopropyl group, an n-butyl group, an isobutyl group, a sec-butyl group, a t-butyl group, and a cyclohexyl group) having 1 to 8 carbon atoms, even more preferably an alkyl group having 1 to 4 carbon atoms, and particularly preferably an ethyl group.

In addition, in a case where $R^2$ in Formula (I) is an ethyl group, —$CH_2$— constituting the ethyl group is most preferably substituted with —CO—.

In the present invention, from the reason that affinity with the substrate is increased and the effect of unevenly distributing the polymer compound to the substrate side is large, it is preferable that the repeating unit (I) has an acetoacetyl group.

In addition, in the present invention, from the reason that affinity with the substrate is increased and the effect of unevenly distributing the polymer compound to the substrate side is large, it is preferable that the repeating unit (I) is a repeating unit represented by Formula (IV). In Formula (IV), $R^1$ represents a hydrogen atom or a methyl group.

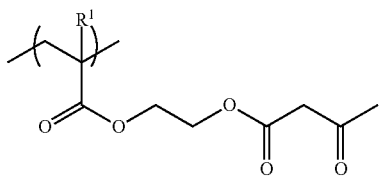

(IV)

Specific examples of a monomer constituting such a repeating unit (I) include acetoacetoxyethyl (meth)acrylate, acetoacetoxypropyl (meth)acrylate, and N-(2-acetoacetoxyethyl) (meth)acrylamide.

Here, the term "(meth)acrylate" is a notation meaning acrylate or methacrylate, and the term "(meth)acrylamide" is a notation meaning acrylamide or methacrylamide.

In the present invention, the content of the repeating unit (I) is preferably 35% to 80% by mass and more preferably 50% to 65% by mass with respect to all the repeating units of the polymer compound.

[Repeating Unit (II)]

The repeating unit (II) included in the polymer compound according to the embodiment of the present invention is a repeating unit represented by Formula (II).

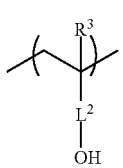

(II)

In Formula (II), $R^3$ represents a hydrogen atom or a methyl group.

In addition, in Formula (II), $L^2$ represents a single bond, or a divalent linking group selected from the group consisting of —O—, —C(=O)—, —(C=O)O—, —(C=O)NR$^6$—, a divalent aliphatic group which may have a substituent, a divalent aromatic group which may have a substituent, and a combination of these groups. $R^6$ represents a hydrogen atom or an alkyl group having 1 to 20 carbon atoms.

Here, the above-mentioned divalent linking group represented by one aspect of $L^2$ in Formula (II) is the same as the above-described divalent linking group represented by one aspect of $L^1$ in Formula (I).

In the divalent aliphatic group which may have a substituent and the divalent aromatic group which may have a substituent, which are represented by one aspect of $L^2$ in Formula (II), specific examples of the substituent which may be included include, as described in $L^1$ in Formula (I), an alkyl group, an alkoxy group, a halogen atom, and a hydroxyl group. Among these, a hydroxyl group is preferable.

In the present invention, from the reason that radical polymerization is possible, $L^2$ in Formula (II) is preferably a divalent linking group selected from the group consisting of —C(=O)—, —(C=O)O—, a divalent aliphatic group which may have a substituent, and a combination of these groups, and more preferably a divalent linking group having —(C=O)O— in a moiety linked to the main chain and having a divalent aliphatic group.

In addition, in the present invention, from the reason that vertical alignment performance of the liquid crystalline compound is enhanced and alignment can be further improved, $L^2$ in Formula (II) is preferably a divalent linking group including a divalent aliphatic group having a hydroxyl group, and more preferably a divalent linking group having —(C=O)O— in a moiety linked to the main chain and having a divalent aliphatic group having a hydroxyl group.

Specific examples of a monomer constituting such a repeating unit (II) include glycerin mono(meth)acrylate, 2-hydroxyethyl (meth)acrylate, (meth)acrylic acid, and polyethylene glycol mono(meth)acrylate.

In the present invention, the content of the repeating unit (II) is preferably 5% to 25% by mass and more preferably 10% to 20% by mass with respect to all the repeating units of the polymer compound.

[Repeating Unit (III)]

The repeating unit (III) included in the polymer compound according to the embodiment of the present invention is a repeating unit represented by Formula (III).

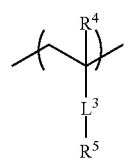

(III)

In Formula (III), $R^4$ represents a hydrogen atom or a methyl group.

In addition, in Formula (III), $L^3$ represents a single bond, or a divalent linking group selected from the group consisting of —O—, —C(=O)—, —(C=O)O—, —(C=O)NR$^6$—, a divalent aliphatic group which may have a substituent, a divalent aromatic group which may have a substituent, and a combination of these groups. $R^6$ represents a hydrogen atom or an alkyl group having 1 to 20 carbon atoms.

In addition, in Formula (III), $R^5$ represents an alkyl group having 4 to 20 carbon atoms, in which at least one hydrogen atom is substituted with a fluorine atom.

Here, the above-mentioned divalent linking group represented by one aspect of $L^3$ in Formula (III) is the same as the above-described divalent linking group represented by one aspect of $L^1$ in Formula (I).

In addition, in the alkyl group having 4 to 20 carbon atoms represented by $R^5$ in Formula (III), in which at least one hydrogen atom is substituted with a fluorine atom, examples of an alkyl group before the substitution include a linear, branched, or cyclic alkyl group having 4 to 18 carbon atoms, and suitable examples thereof include a linear alkyl group (such as a butyl group, a hexyl group, an octyl group, and a dodecyl group) having 4 to 12 carbon atoms.

In the present invention, from the viewpoint of obtaining a raw material, the repeating unit (III) is preferably a repeating unit represented by Formula (V).

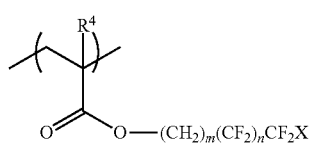

(V)

In Formula (V), $R^4$ represents a hydrogen atom or a methyl group, and X represents a hydrogen atom or a fluorine atom. m and n each independently represent an integer of 1 to 20, and m+n represents an integer of 4 to 20.

Specific examples of a monomer constituting such a repeating unit (III) include 2-(perfluorobutyl)ethyl (meth)acrylate, 2-(perfluorohexyl)ethyl (meth)acrylate, 1H,1H,7H-dodecafluoroheptyl methacrylate, and 4-(perfluoropentyloxy)benzyl acrylate.

In the present invention, from the reason that alignment can be further improved, the content of the repeating unit (III) is preferably 30% by mass or less and more preferably 20% by mass or less with respect to all the repeating units of the polymer compound.

[Repeating Unit (VI)]

From the reason that surface unevenness can be further suppressed, it is preferable that the polymer compound according to the embodiment of the present invention further has a repeating unit (hereinafter, also abbreviated as a "repeating unit (VI)") represented by Formula (VI).

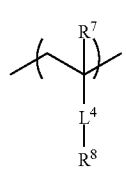

(VI)

In Formula (VI), $R^7$ represents a hydrogen atom or a methyl group, $R^8$ represents an alkyl group having 1 to 20 carbon atoms, and $L^4$ represents a single bond, or a divalent linking group selected from the group consisting of —O—, —C(=O)—, —(C=O)O—, —(C=O)NR$^6$—, a divalent aliphatic group which may have a substituent, a divalent aromatic group which may have a substituent, and a combination of these groups. $R^6$ represents a hydrogen atom or an alkyl group having 1 to 20 carbon atoms.

Here, the above-mentioned divalent linking group represented by $L^4$ in Formula (VI) is the same as the above-described divalent linking group represented by $L^1$ in Formula (I).

In addition, examples of the alkyl group having 1 to 20 carbon atoms represented by $R^8$ in Formula (VI) include a linear, branched, or cyclic alkyl group having 4 to 18 carbon atoms, and suitable examples thereof include a linear alkyl group (such as a hexyl group, an octyl group, and a dodecyl group) having 6 to 15 carbon atoms.

Specific examples of a monomer constituting such a repeating unit (VI) include octadecyl (meth)acrylate, lauryl (meth)acrylate, N-lauryl acrylamide, butyl (meth)acrylate, isobonyl (meth)acrylate, 2-ethylhexyl (meth)acrylate, 2-butoxyethyl (meth)acrylate, and 4-butoxybenzyl acrylate.

In the present invention, in a case where the polymer compound has an optional repeating unit (VI), the content of the repeating unit (VI) is preferably 30% by mass or less and more preferably 3% to 15% by mass with respect to all the repeating units of the polymer compound.

Specific examples of the polymer compound having the repeating units (I) to (III) and the optional repeating unit (VI) include polymer compounds represented by Formulae (A-1) to (A-9).

In Formulae (A-1) to (A-9), numerical values denoted in each repeating unit are numerical values representing % by mass with respect to all the repeating units of the polymer compound.

In addition, in the following description, the polymer compound represented by Formula (A-1) is referred to as a "polymer compound A-1". In addition, the polymer compounds represented by Formulae (A-2) to (A-9) are referred to in the same manner.

(A-1)

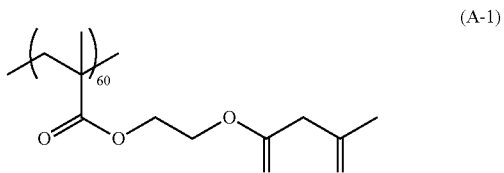

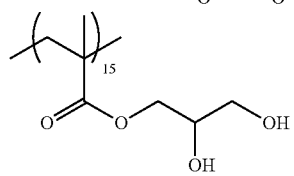

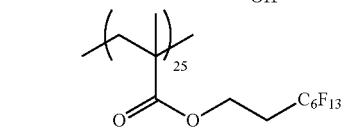

(A-2)

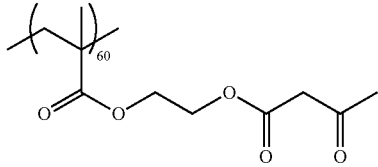

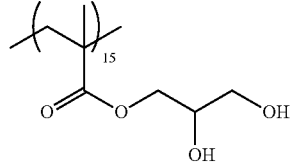

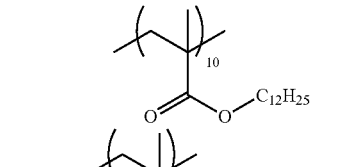

(A-3)

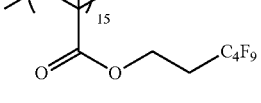

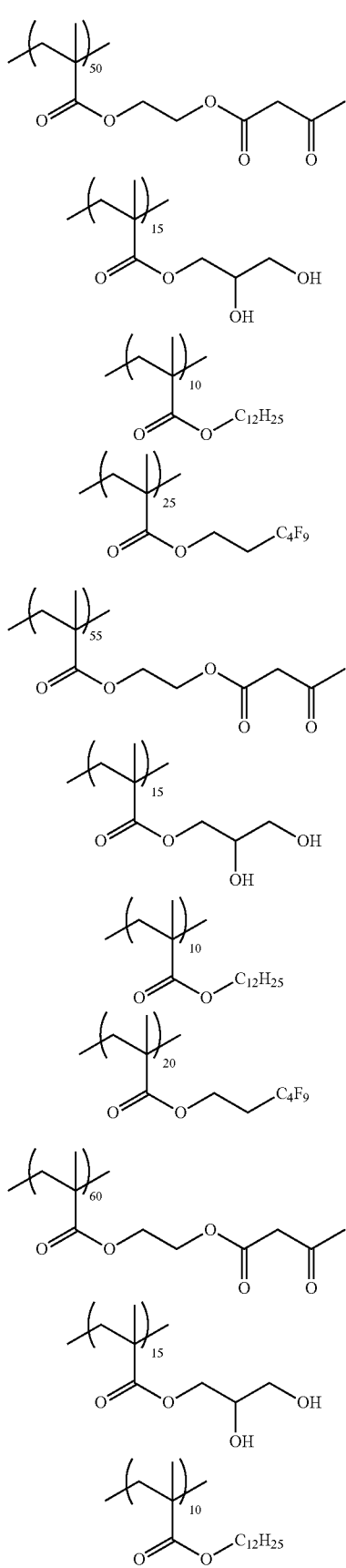
(A-4)
(A-5)
(A-6)
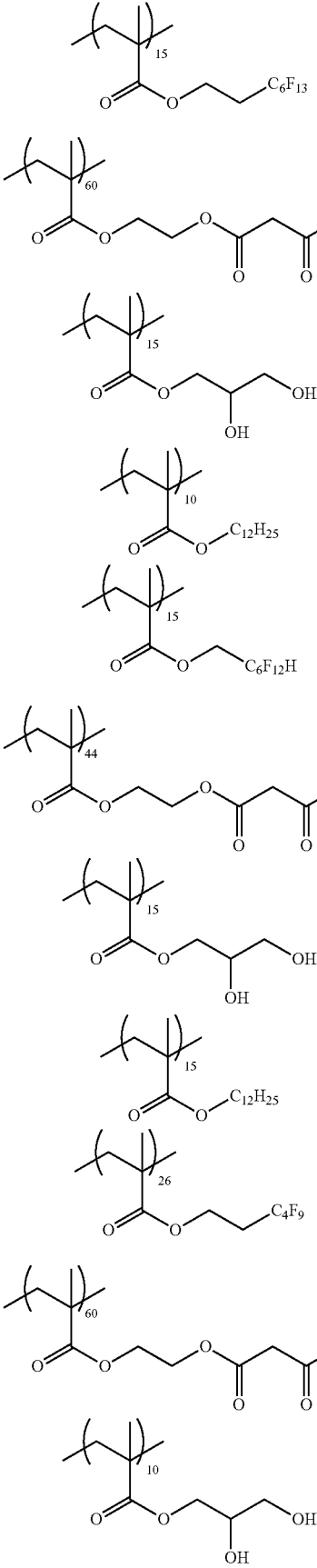
(A-7)
(A-8)
(A-9)

-continued

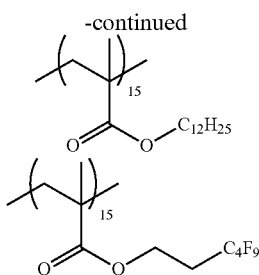

From the reason that the molecular design of the side chain is diversified and the main chain is easily formed by an addition polymerization, the polymer compound according to the embodiment of the present invention is preferably an acrylic or methacrylic polymer.

The acid value of the polymer compound according to the embodiment of the present invention is, as described above, 115 mgKOH/g or more, and from the reason that alignment can be further improved, is preferably 120 mgKOH/g or more and more preferably 125 mgKOH/g or more.

In addition, the hydroxyl value of the polymer compound according to the embodiment of the present invention is, as described above, 70 mgKOH/g or more, and from the reason that alignment can be further improved, is preferably 80 mgKOH/g or more and more preferably 90 mgKOH/g or more.

The weight-average molecular weight of the polymer compound according to the embodiment of the present invention is not particularly limited, but from the reason that alignment is further improved and surface unevenness can be further suppressed, is preferably 5,000 to 500,000, more preferably 5,000 to 100,000, and even more preferably 10,000 to 100,000.

Here, the weight-average molecular weight of the polymer compound is defined as a value in terms of polystyrene measured by gel permeation chromatography (GPC). The weight-average molecular weight of the polymer compound can be measured, for example, under measurement conditions of a flow rate of 0.50 ml/min and a temperature of 40° C., using EcoSEC HLC-8320 GPC (manufactured by Tosoh Corporation) as a GPC device, three TSKgel SuperAWM-H (manufactured by Tosoh Corporation) as a column, and N-methylpyrrolidone (NMP) as an eluent, and calculated as a value in terms of polystyrene.

[Liquid Crystal Composition]

The liquid crystal composition according to an embodiment of the present invention is a liquid crystal composition containing the polymer compound according to the embodiment of the present invention and a liquid crystalline compound having a polymerizable group.

[Liquid Crystalline Compound]

The liquid crystalline compound contained in the liquid crystal composition according to the embodiment of the present invention is not particularly limited as long as the liquid crystalline compound has a polymerizable group, and a known liquid crystalline compound in the related art can be used.

Here, specific examples of the polymerizable group include an acryloyl group, a methacryloyl group, a vinyl group, a styryl group, and an allyl group. Among these, an acryloyl group or a methacryloyl group is preferable.

Generally, liquid crystalline compounds are classified into a rod-like type and a disk-like type according to the shape thereof. Further, each includes a low molecular type and a polymer type. The term "polymer" generally refers to a compound having a degree of polymerization of 100 or more (Polymer Physics-Phase Transition Dynamics, by Masao Doi, p. 2, published by Iwanami Shoten, 1992).

In the present invention, any type of liquid crystalline compound can be used, but a rod-like liquid crystalline compound or a disk-like liquid crystalline compound (discotic liquid crystalline compound) is preferably used. Two or more kinds of rod-like liquid crystalline compounds, two or more kinds of disk-like liquid crystalline compounds, or a mixture of a rod-like liquid crystalline compound and a disk-like liquid crystalline compound may be used.

In addition, from the viewpoint of fixing an alignment, the liquid crystalline compound preferably has two or more polymerizable groups described above. In the case of a mixture of two or more kinds of liquid crystalline compounds, at least one kind of the liquid crystalline compound preferably has two or more polymerizable groups in one molecule.

As the rod-like liquid crystalline compound, for example, the rod-like liquid crystalline compounds described in claim 1 of JP1999-513019A (JP-H11-513019A) or paragraphs [0026] to [0098] of JP2005-289980A can be preferably used, and as the discotic liquid crystalline compounds, for example, the discotic liquid crystalline compounds described in paragraphs [0020] to [0067] of JP2007-108732A or paragraphs [0013] to [0108] of JP2010-244038A can be preferably used, but the liquid crystalline compounds are not limited thereto.

In the present invention, it is preferable to use a rod-like liquid crystalline compound as the liquid crystalline compound, and for example, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used.

In the present invention, the content of the polymer compound according to the embodiment of the present invention is preferably less than 10 parts by mass, more preferably 0.5 parts by mass or more and less than 10 parts by mass, even more preferably 1 to 8 parts by mass, and particularly preferably 1 to 5 parts by mass with respect to 100 parts by mass of the above-described liquid crystalline compound.

[Vertical Alignment Agent]

From the reason that alignment is further improved, the liquid crystal composition according to the embodiment of the present invention preferably contains a vertical alignment agent.

Examples of the vertical alignment agent include an onium salt compound and a boronic acid compound. Among these, an onium salt compound is preferable.

<Onium Salt Compound>

As the onium salt compound, a known onium compound as a vertical alignment agent can be used. Specific examples thereof include the compounds described in paragraphs 0042 to 0052 of JP2016-105127A.

In a case where the liquid crystal composition contains the onium salt compound, the content of the onium salt compound is preferably 0.5 to 5 parts by mass and more preferably 1 to 3 parts by mass with respect to 100 parts by mass of the above-described liquid crystalline compound.

<Boronic Acid Compound>

As the boronic acid compound, a known boronic acid compound as a vertical alignment agent can be used. Specific examples thereof include the compounds described in paragraphs 0053 and 0054 of JP2016-105127A.

In a case where the liquid crystal composition contains the boronic acid compound, the content of the boronic acid compound is preferably 0.1 to 5 parts by mass and more preferably 0.5 to 3 parts by mass with respect to 100 parts by mass of the above-described liquid crystalline compound.

[Polymerization Initiator]

The liquid crystal composition according to the embodiment of the present invention preferably contains a polymerization initiator.

The polymerization initiator to be used is preferably a photopolymerization initiator capable of initiating a polymerization reaction by irradiation with ultraviolet rays.

Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acyl phosphine oxide compounds (described in JP1988-040799B (JP-S63-040799B), JP1993-029234B (JP-1105-029234B), JP1998-095788A (JP-H10-095788A), and JP1998-029997A (JP-H10-029997A)).

[Polymerizable Monomer]

From the viewpoint of evenness of the coating film and hardness of the phase difference layer, the liquid crystal composition according to the embodiment of the present invention may include a polymerizable monomer.

Examples of the polymerizable monomer include radically polymerizable or cationically polymerizable compounds. Preferably, the polymerizable monomer is a polyfunctional radically polymerizable monomer, and a polymerizable monomer which is copolymerizable with a disk-like liquid crystalline compound containing the above-described polymerizable group is preferable. Examples thereof include compounds described in paragraphs 0018 to 0020 of JP2002-296423A.

[Surfactant]

From the viewpoint of evenness of the coating film and hardness of the phase difference layer, the liquid crystal composition according to the embodiment of the present invention may include a surfactant.

Examples of the surfactant include a known compound in the related art, and a fluorine-based compound is particularly preferable. Specific examples thereof include compounds described in paragraphs 0028 to 0056 of JP2001-330725A, and compounds described in paragraphs 0069 to 0126 of JP2003-295212.

[Solvent]

From the viewpoint of workability to form the phase difference layer, the liquid crystal composition according to the embodiment of the present invention preferably contains a solvent.

Specific examples of the solvent include ketones (for example, acetone, 2-butanone, methyl isobutyl ketone, cyclohexanone, cyclopentanone, and the like), ethers (for example, dioxane, tetrahydrofuran, and the like), aliphatic hydrocarbons (for example, hexane and the like), alicyclic hydrocarbons (for example, cyclohexane and the like), aromatic hydrocarbons (for example, toluene, xylene, trimethylbenzene, and the like), halogenated carbons (for example, dichloromethane, dichloroethane, dichlorobenzene, chlorotoluene, and the like), esters (for example, methyl acetate, ethyl acetate, butyl acetate, and the like), water, alcohols (for example, ethanol, isopropanol, butanol, cyclohexanol, and the like), cellosolves (for example, methyl cellosolve, ethyl cellosolve, and the like), cellosolve acetates, sulfoxides (for example, dimethyl sulfoxide and the like), and amides (for example, dimethyl formamide, dimethyl acetamide, and the like), and these solvents may be used alone or in combination of two or more kinds thereof.

[Phase Difference Layer]

The phase difference layer according to an embodiment of the present invention is a phase difference layer formed of the liquid crystal composition according to the embodiment of the present invention, and is a layer formed by fixing the vertical alignment of the liquid crystalline compound included in the liquid crystal composition according to the embodiment of the present invention.

Here, the vertical alignment in a case where the liquid crystalline compound is a rod-like liquid crystalline compound is also referred to as a homeotropic alignment and means an alignment in which an angle formed between a surface of the substrate described later and a director of the rod-like liquid crystalline compound is within a range of 70° to 90°. The alignment in which the angle is within a range of 80° to 90° is preferable, and the alignment in which the angle is within a range of 85° to 90° is more preferable.

In addition, the vertical alignment in a case where the liquid crystalline compound is a disk-like liquid crystalline compound means an alignment in which an angle formed between the surface of the substrate described later and a plane of the disk of the disk-like liquid crystalline compound is within a range of 70° to 90°. The alignment in which the angle is within a range of 80° to 90° is preferable, and the alignment in which the angle is within a range of 85° to 90° is more preferable.

[Method of Forming Phase Difference Layer]

In the present invention, examples of a method of forming the phase difference layer include a method in which the liquid crystal composition according to the embodiment of the present invention is applied to the substrate described later to attain a desired alignment state and then the alignment state is fixed by polymerization.

Examples of the method of applying the liquid crystal composition include a wire bar coating method, an extrusion coating method, a direct gravure coating method, a reverse gravure coating method, and a die-coating method.

The polymerization conditions are not particularly limited, but in polymerization by light irradiation, ultraviolet rays are preferably used. The irradiation dose is preferably 10 mJ/cm$^2$ to 50 J/cm$^2$, more preferably 20 mJ/cm$^2$ to 5 J/cm$^2$, even more preferably 30 mJ/cm$^2$ to 3 J/cm$^2$, and particularly preferably 50 to 1000 mJ/cm$^2$. In addition, in order to promote the polymerization reaction, polymerization may be performed under heating conditions.

[Optical Film]

The optical film according to an embodiment of the present invention is an optical film having the phase difference layer according to the embodiment of the present invention.

In addition, it is preferable that the optical film according to the embodiment of the present invention is an aspect having a substrate and the phase difference layer according to the embodiment of the present invention which is provided on the substrate to be adjacent to the substrate.

Hereinafter, various members used for the optical according to the embodiment of the present invention will be described in detail.

[Substrate]

The above-mentioned substrate is a substrate for supporting the phase difference layer according to the embodiment of the present invention, and examples thereof include a substrate to which the liquid crystal composition is applied in a case where the phase difference layer is formed by applying the liquid crystal composition according to the embodiment of the present invention. In the present invention, the polarizer described later may serve as the substrate.

Such a substrate is preferably transparent, and specifically, the substrate preferably has a light transmittance of 80% or more. The term "transparent" indicates that the transmittance of visible light is 60% or more.

Examples of such a substrate include glass substrates and polymer films.

Examples of the material for the polymer film include cellulose-based polymers such as triacetyl cellulose (TAC), diacetyl cellulose, and cellulose acetate propionate; acrylic polymers such as polymethacrylic acid ester, and polyacrylic acid ester; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; polymers having an alicyclic structure such as a norbornene-based polymer, a polymer of monocyclic cyclic olefin, a polymer of cyclic conjugated diene, and a vinyl alicyclic hydrocarbon polymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; or polymers obtained by mixing these polymers.

Among these materials, cellulose-based polymers or polymers having an alicyclic structure are preferable.

In a case where the optical film according to the embodiment of the present invention has a substrate, the thickness of the substrate is not particularly limited, but is preferably 5 to 60 μm and more preferably 5 to 30 μm.

In addition, the thickness of the phase difference layer of the optical film according to the embodiment of the present invention is not particularly limited, but is preferably 0.1 to 10 μm and more preferably 0.5 to 5 μm.

[Polarizing Plate]

The polarizing plate according to an embodiment of the present invention is a polarizing plate having the above-described optical film according to the embodiment of the present invention.

In addition, in a case where the above-described substrate does not serve as a polarizer, the polarizing plate according to the embodiment of the present invention has a polarizer.

[Polarizer]

The polarizer of the polarizing plate according to the embodiment of the present invention is not particularly limited as long as the polarizer is a member having a function of converting light into specific linearly polarized light, and a known absorptive type polarizer and reflective type polarizer in the related art can be used.

An iodine-based polarizer, a dye-based polarizer using a dichroic dye, a polyene-based polarizer, and the like are used as the absorptive type polarizer. The iodine-based polarizer and the dye-based polarizer include a coating type polarizer and a stretching type polarizer, and any one of these polarizers can be applied. However, a polarizer which is produced by allowing polyvinyl alcohol to adsorb iodine or a dichroic dye and performing stretching is preferable.

In addition, examples of a method of obtaining a polarizer by performing stretching and dyeing in a state of a laminated film in which a polyvinyl alcohol layer is formed on a substrate include methods disclosed in JP5048120B, JP5143918B, JP4691205B, JP4751481B, and JP4751486B, and known technologies related to these polarizers can be preferably used.

A polarizer in which thin films having different birefringence are laminated, a wire grid type polarizer, a polarizer in which a cholesteric liquid crystal having a selective reflection range and a ¼ wavelength plate are combined, and the like are used as the reflective type polarizer.

Among these, from the viewpoint of further improving adhesiveness, a polarizer including a polyvinyl alcohol-based resin (a polymer including —$CH_2$—CHOH— as a repeating unit; in particular, at least one selected from the group consisting of polyvinyl alcohol and an ethylene-vinyl alcohol copolymer) is preferable.

In the present invention, the thickness of the polarizer is not particularly limited, but is preferably 3 μm to 60 μm, more preferably 5 μm to 30 μm, and even more preferably 5 μm to 15 μm.

[Adhesive Layer]

The polarizing plate according to the embodiment of the present invention may have an adhesive layer arranged between the phase difference layer in the optical film according to the embodiment of the present invention and the polarizer.

The adhesive layer used for lamination of the phase difference layer and the polarizer is, for example, a substance in which a ratio (tan δ=G"/G') between storage elastic modulus G' and loss elastic modulus G" is 0.001 to 1.5, where G' and G" are measured with a dynamic viscoelastometer. Such a substance includes a so-called gluing agent or easily creepable substance. Examples of the gluing agent which can be used in the present invention include a polyvinyl alcohol-based gluing agent, but the gluing agent is not limited thereto.

[Image Display Device]

The image display device according to an embodiment of the present invention is an image display device having the optical film according to the embodiment of the present invention or the polarizing plate according to the embodiment of the present invention.

A display element used for the image display device according to the embodiment of the present invention is not particularly limited, and examples thereof include a liquid crystal cell, an organic electroluminescent (hereinafter, abbreviated as "EL") display panel, and a plasma display panel.

Among these, a liquid crystal cell or an organic EL display panel is preferable, and a liquid crystal cell is more preferable. That is, as the image display device according to the embodiment of the present invention, a liquid crystal display device using a liquid crystal cell as a display element or an organic EL display device using an organic EL display panel as a display element is preferable, and a liquid crystal display device is more preferable.

[Liquid Crystal Display Device]

A liquid crystal display device as an example of the image display device according to the embodiment of the present invention is a liquid crystal display device including the polarizing plate according to the embodiment of the present invention and a liquid crystal cell.

In the present invention, it is preferable that the polarizing plate according to the embodiment of the present invention is used for a polarizing plate of the front side, out of polarizing plates provided on the both sides of the liquid crystal cell, and it is more preferable that the polarizing plate according to the embodiment of the present invention is used for the polarizing plates on the front and rear sides.

Hereinafter, the liquid crystal cell constituting the liquid crystal display device will be described in detail.

<Liquid Crystal Cell>

The liquid crystal cell used for the liquid crystal display device is preferably a vertical alignment (VA) mode, an optically compensated bend (OCB) mode, an in-plane-switching (IPS) mode, or a twisted nematic (TN) mode, but the liquid crystal cell is not limited thereto.

In a TN mode liquid crystal cell, rod-like liquid crystal molecules are substantially aligned horizontally in a case where no voltage is applied thereto and are further aligned in a twisted manner in a range of 60° to 120°. The TN mode liquid crystal cell is most often used in a color TFT liquid crystal display device and is mentioned in many literatures.

In a VA mode liquid crystal cell, rod-like liquid crystal molecules are substantially aligned vertically in a case where no voltage is applied thereto. Examples of the VA mode liquid crystal cells include (1) a VA mode liquid crystal cell in a narrow sense (described in JP1990-176625A (JP-H02-176625A)) in which rod-like liquid crystal molecules are substantially aligned vertically in a case where no voltage is applied thereto and are substantially aligned horizontally in a case where a voltage is applied thereto, (2) a multi-domain VA mode (MVA mode) liquid crystal cell for enlarging the viewing angle (SID97, described in Digest of Tech. Papers (Proceedings) 28 (1997) 845), (3) a liquid crystal cell in a mode (n-ASM mode) in which rod-like liquid crystal molecules are substantially aligned vertically in a case where no voltage is applied thereto and are aligned in twisted multi-domain alignment in a case where a voltage is applied thereto (described in Proceedings of Japanese Liquid Crystal Conference, 58 and 59 (1998)), and (4) a SURVIVAL mode liquid crystal cell (presented in LCD International 98). The liquid crystal cell may be any one of a patterned vertical alignment (PVA) type, an optical alignment type, and a polymer-sustained alignment (PSA) type. These modes are described in detail in JP2006-215326A and JP2008-538819A.

In an IPS mode liquid crystal cell, rod-like liquid crystal molecules are substantially aligned parallel to a substrate and application of a voltage parallel to a surface of the substrate causes the liquid crystal molecules to respond planarly. In the IPS mode, black display occurs in a case where no voltage is applied and the absorption axes of a pair of upper and lower polarizing plates are orthogonal to each other. A method of improving the viewing angle by reducing light leakage during black display in an oblique direction using an optical compensation sheet is described in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

Suitable examples of the organic EL display device which is an example of the image display device according to the embodiment of the present invention include an aspect which includes, from the viewing side, the polarizing plate according to the embodiment of the present invention, a plate having λ/4 function (hereinafter, also referred to as a "λ/4 plate"), and an organic EL display panel in this order.

Here, the "plate having a λ/4 function" refers to a plate having a function of converting linearly polarized light at a specific wavelength into circularly polarized light (or circularly polarized light into linearly polarized light). Specific examples of an aspect in which the λ/4 plate is a single layer structure include a stretched polymer film and a phase difference film in which an optically anisotropic film having a λ/4 function is provided on a support. Specific examples of an aspect in which the λ/4 plate is a multilayer structure include a broadband λ/4 plate obtained by laminating the λ/4 plate and a λ/2 plate.

In addition, the organic EL display panel is a display panel configured using an organic EL element in which an organic light-emitting layer (organic electroluminescent layer) is sandwiched between electrodes (between a cathode and an anode). The configuration of the organic EL display panel is not particularly limited, and any known configuration is adopted.

EXAMPLES

Hereinafter, the features of the present invention will be more specifically described using Examples and Comparative Examples. The materials, amounts used, proportions, treatment contents, treatment procedures, and the like shown in the following examples can be modified as appropriate in the range of not departing from the spirit of the present invention. Therefore, the scope of the present invention should not be construed as being limited to the following specific examples.

Example 1

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 18.00 g (84.00 mmol) of ethylene glycol monoacetoacetate, 4.50 g (28.1 mmol) of glycerin monomethacrylate, 7.50 g (17.9 mmol) of 2-(perfluorohexyl)ethyl acrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-1 represented by Formula (A-1) in methyl ethyl ketone.

The weight-average molecular weight (Mw) of the obtained polymer compound A-1 was 54,000.

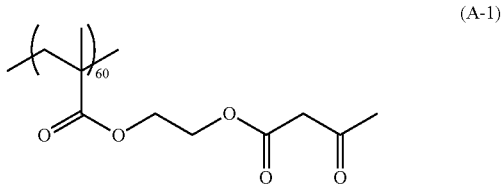
(A-1)

-continued

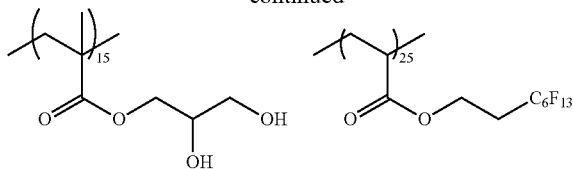

Example 2

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 18.00 g (84.00 mmol) of ethylene glycol monoacetoacetate, 4.50 g (28.1 mmol) of glycerin monomethacrylate, 7.50 g (17.9 mmol) of 2-(perfluorohexyl)ethyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-2 represented by Formula (A-2) in methyl ethyl ketone.

The weight-average molecular weight (Mw) of the obtained polymer compound A-2 was 52,000.

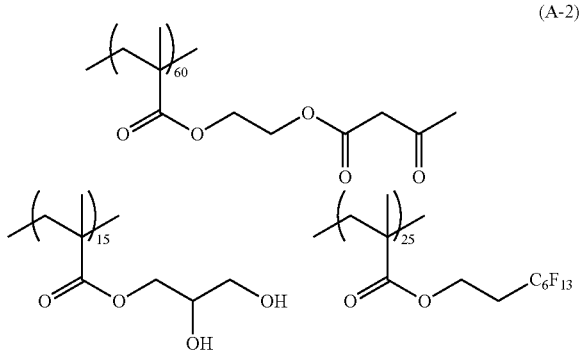

(A-2)

Example 3

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 18.00 g (84.00 mmol) of ethylene glycol monoacetoacetate, 4.50 g (28.1 mmol) of glycerin monomethacrylate, 3.00 g (11.8 mmol) of lauryl methacrylate, 4.50 g (13.5 mmol) of 2-(perfluorobutyl)ethyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-3 represented by Formula (A-3) in methyl ethyl ketone.

The weight-average molecular weight (Mw) of the obtained polymer compound A-3 was 50,000.

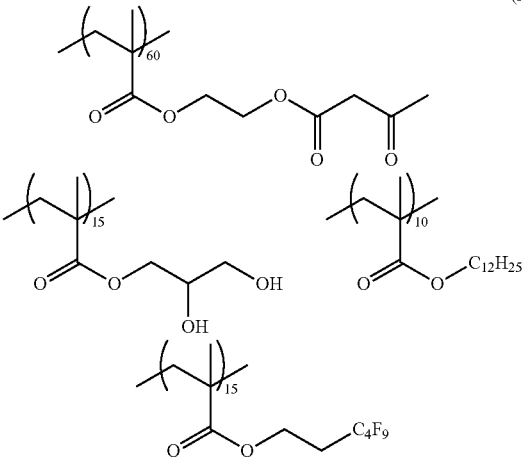

(A-3)

Example 4

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 15.00 mL (70.00 mmol) of ethylene glycol monoacetoacetate, 4.50 g (28.1 mmol) of glycerin monomethacrylate, 3.00 g (11.8 mmol) of methacrylate, 7.50 g (17.4 mmol) of 2-(perfluorobutyl)ethyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-4 represented by Formula (A-4) in methyl ethyl ketone.

The weight-average molecular weight (Mw) of the obtained polymer compound A-4 was 47,000.

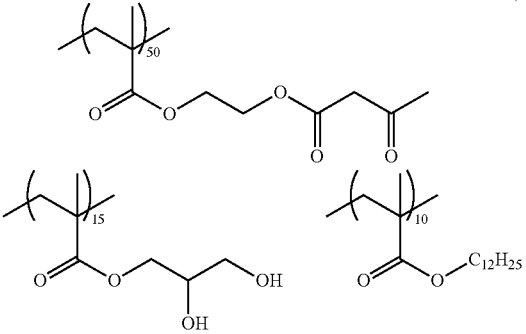

(A-4)

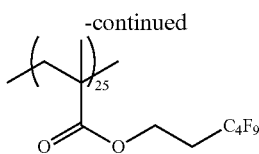

Example 5

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 16.50 g (77.00 mmol) of ethylene glycol monoacetoacetate, 4.50 g (28.1 mmol) of glycerin monomethacrylate, 3.00 g (11.8 mmol) of methacrylate, 6.00 g (13.9 mmol) of 2-(perfluorobutyl)ethyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound. A-5 represented by Formula (A-5) in methyl ethyl ketone.

The weight-average molecular weight (Mw) of the obtained polymer compound A-5 was 57,000.

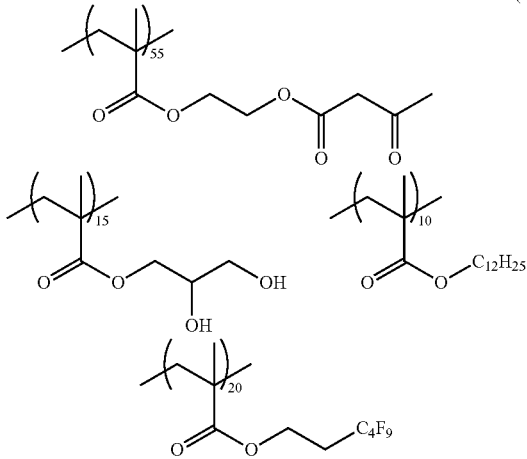

(A-5)

Example 6

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 18.00 g (84.00 mmol) of ethylene glycol monoacetoacetate, 4.50 g (28.1 mmol) of glycerin monomethacrylate, 3.00 g (11.8 mmol) of lauryl methacrylate, 4.50 g (10.8 mmol) of 2-(perfluorohexyl)ethyl acrylate, 31.20 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-6 represented by Formula (A-6) in methyl ethyl ketone.

The weight-average molecular weight (Mw) of the obtained polymer compound A-6 was 42,000.

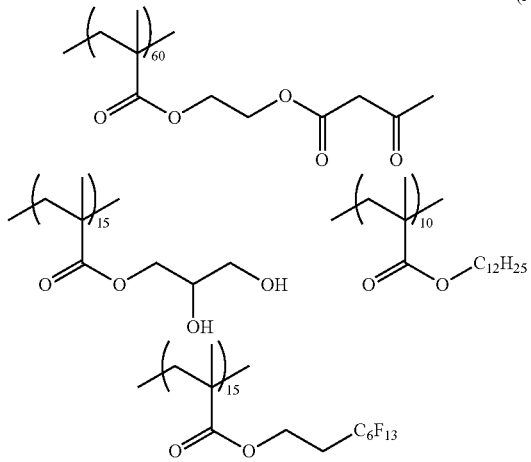

(A-6)

Example 7

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 18.00 g (84.00 mmol) of ethylene glycol monoacetoacetate, 4.50 g (28.1 mmol) of glycerin monomethacrylate, 3.00 g (11.8 mmol) of lauryl methacrylate, 4.50 g (11.2 mmol) of 1H,1H,7H-dodecafluoroheptyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-7 represented by Formula (A-7) in methyl ethyl ketone.

The weight-average molecular weight (Mw) of the obtained polymer compound A-7 was 45,000.

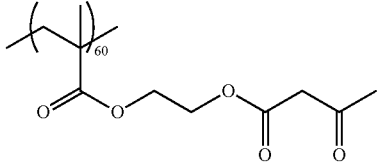

(A-7)

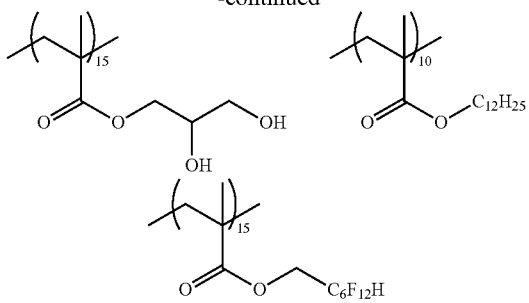

Example 8

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 13.20 g (61.60 mmol) of ethylene glycol monoacetoacetate, 4.50 g (28.1 mmol) of glycerin monomethacrylate, 4.50 g (17.7 mmol) of lauryl methacrylate, 7.80 g (23.4 mmol) of 2-(perfluorobutyl)ethyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound A-8 represented by Formula (A-8) in methyl ethyl ketone.

The weight-average molecular weight (Mw) of the obtained polymer compound A-8 was 49,000.

(A-8)

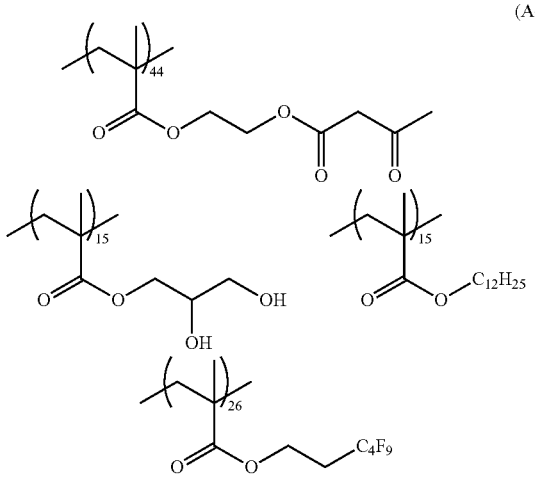

Example 9

12.13 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 18.00 g (84.00 mmol) of ethylene glycol monoacetoacetate, 3.00 g (18.7 mmol) of glycerin monomethacrylate, 4.50 g (17.7 mmol) of lauryl methacrylate, 4.50 g (13.5 mmol) of 2-(perfluorobutyl)ethyl methacrylate, 16.07 g of methyl ethyl ketone, and 1.20 g (5.21 mmol) of azo polymerization initiator (V-601, manufactured by Wako Pure Chemical Corporation) was added dropwise at a constant speed so that the dropwise addition was completed in 120 minutes.

After the dropwise addition, stirring was further continued for 4 hours. After cooling, 15.60 g of methyl ethyl ketone was added to obtain a solution of a polymer compound. A-9 represented by Formula (A-9) in methyl ethyl ketone.

The weight-average molecular weight (Mw) of the obtained polymer compound A-9 was 51,000.

(A-9)

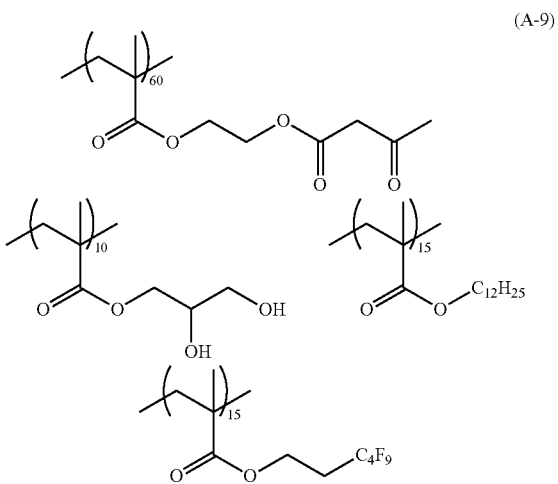

Comparative Example 1

A solution of a polymer compound B-1 represented by Formula (B-1) in methyl ethyl ketone was obtained in the same manner as in Example 1, except that monomers and the compositional ratio of the monomers were each changed.

The weight-average molecular weight (Mw) of the obtained polymer compound B-1 was 43,000.

(B-1)

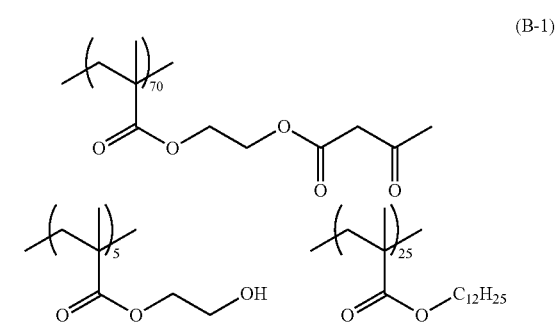

Comparative Example 2

A solution of a polymer compound B-2 represented by Formula (B-2) in methyl ethyl ketone was obtained in the same manner as in Example 1, except that monomers and the compositional ratio of the monomers were each changed.

The weight-average molecular weight (Mw) of the obtained polymer compound B-2 was 48,000.

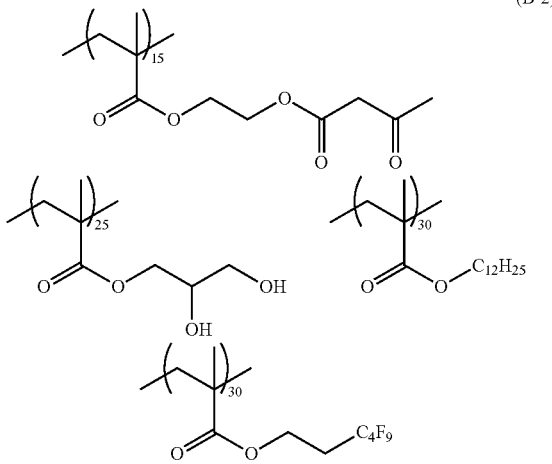

(B-2)

Comparative Example 3

A polymer compound B-3 represented by Formula (B-3) was synthesized according to the method described in JP1999-049825A (JP-H11-049825A).

The weight-average molecular weight (Mw) of the obtained polymer compound B-3 was 23,000.

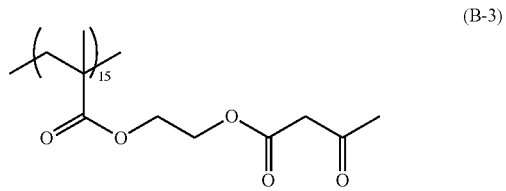

(B-3)

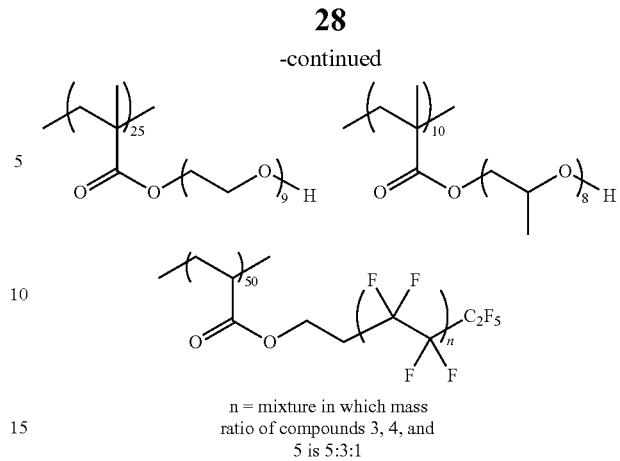

n = mixture in which mass ratio of compounds 3, 4, and 5 is 5:3:1

[Calculation of Acid Value and Hydroxyl Value]

For each of the obtained polymer compounds, the acid value and the hydroxyl value were calculated by the methods described above. The results are shown in Table 1.

[Production of Optical Film]

Using each of the obtained polymer compounds, optical films were produced by the following method.

As a substrate, a commercially available cellulose triacetate film "ZRD40SL" (manufactured by FUJIFILM Corporation) was used.

A liquid crystal composition including a rod-like liquid crystal compound having the following composition was applied on the ZRD40SL with a #3.5 wire bar.

In order to dry a solvent of the coating solution and to align and mature the rod-like liquid crystal compound, the film was heated for 60 seconds with warm air at 40° C.

Next, irradiation (300 mJ/cm$^2$) with ultraviolet rays was performed at 40° C. and an oxygen concentration of 100 ppm under a nitrogen purge to fix the alignment of the liquid crystal compound, thereby producing an optical film.

| (Liquid Crystal Composition) | |
|---|---|
| The following rod-like liquid crystalline compound | 100 parts by mass |
| Polymerization initiator (IRGACURE OXE01 manufactured by BASF SE) | 4 parts by mass |
| Polymerizable monomer (A-TMMT-75MJ manufactured by Shin-Nakamura Chemical Co., Ltd.) | 4 parts by mass |
| The following onium salt compound | 1.5 parts by mass |
| The following fluorine-based polymer | 0.3 parts by mass |
| Each polymer compound | 3 parts by mass |
| Toluene | 447.4 parts by mass |
| Methyl ethyl ketone | 191.8 parts by mass |

Rod-like liquid crystalline compound

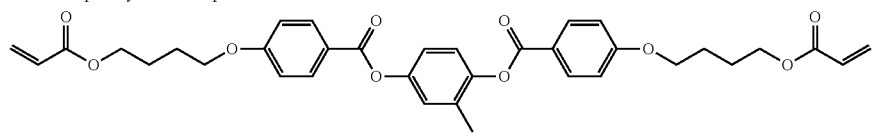

Onium salt compound

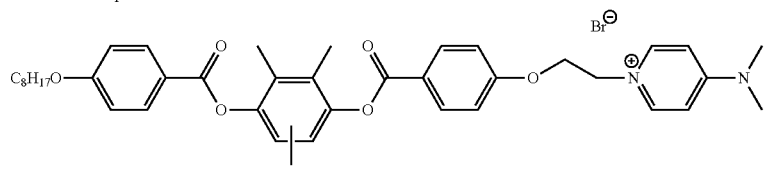

(Liquid Crystal Composition)

Flourine-based polymer

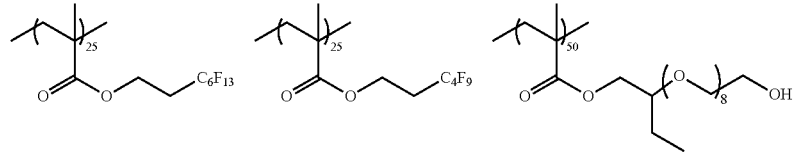

[Evaluation of Alignment]

A polarizing microscope was set under a crossed Nicols condition, each of the produced optical films was inserted into a stage, and the stage was rotated such that the slow axis of a substrate was parallel to the analyzer or polarizer of the polarizing microscope.

In this state, when each optical film was observed, an optical film in which a uniform dark field was observed for an area of 98% or more exhibited very excellent alignment and was evaluated as "A", an optical film in which a uniform dark field was observed for an area of 95% or more and less than 98% exhibited excellent alignment and was evaluated as "B", an optical film in which a uniform dark field was observed for an area of 80% or more and less than 95% exhibited slightly deteriorated alignment and was evaluated as "C", and an optical film in which a uniform dark field was observed for an area of less than 80% exhibited deteriorated alignment and was evaluated as "D", The results are shown in Table 1.

[Evaluation of Surface Unevenness]

Surface unevenness in a case where the optical film was tilted obliquely on a film viewer in a state of crossed Nicoll was visually evaluated. An optical film in which an area where the surface unevenness can be visually recognized was less than 2% was evaluated as "A", an optical film in which an area where the surface unevenness can be visually recognized was 2% or more and less than 5% was evaluated as "B", an optical film in which an area where the surface unevenness can be visually recognized was 5% or more and less than 20% was evaluated as "C", and an optical film in which an area where the surface unevenness can be visually recognized was 20% or more was evaluated as "D". The results are shown in Table 1. In Table 1, "-" is a notation indicating that alignment was poor and no surface unevenness was observed.

TABLE 1

| | Polymer compound | Weight-average molecular weight | Acid value [mgKOH/g] | Hydroxyl value [mgKOH/g] | Alignment | Surface unevenness |
|---|---|---|---|---|---|---|
| Example 1 | A-1 | 54000 | 157 | 105 | A | B |
| Example 2 | A-2 | 52000 | 157 | 105 | A | B |
| Example 3 | A-3 | 50000 | 157 | 105 | A | A |
| Example 4 | A-4 | 47000 | 131 | 105 | A | A |
| Example 5 | A-5 | 57000 | 144 | 105 | A | A |
| Example 6 | A-6 | 42000 | 157 | 105 | A | A |
| Example 7 | A-7 | 45000 | 157 | 105 | A | A |
| Example 8 | A-8 | 49000 | 115 | 105 | B | A |
| Example 9 | A-9 | 51000 | 157 | 70 | B | A |
| Comparative Example 1 | B-1 | 43000 | 183 | 22 | D | — |
| Comparative Example 2 | B-2 | 48000 | 56 | 175 | D | — |
| Comparative Example 3 | B-3 | 23000 | 39 | 39 | D | — |

From the results shown in Table 1, it was found that, in a case of using the polymer compound B-1 not having the repeating unit (III), alignment was deteriorated (Comparative Example 1).

In addition, it was found that, even in a case of having the repeating units (I) to (III), in a case of using the polymer compound B-2 in which the acid value was less than 115 mgKOH/g, alignment was deteriorated (Comparative Example 2).

In addition, it was found that, even in a case of having the repeating units (I) to (III), in a case of using the polymer compound B-3 in which the acid value was less than 115 mgKOH/g and the hydroxyl value was less than 70 mgKOH/g, alignment was deteriorated (Comparative Example 3).

In contrast, it was found that, in a case of using the polymer compounds A-1 to A-9 which had the repeating units (I) to (III) and in which the acid value was 115 mgKOH/g or more and the hydroxyl value was 70 mgKOH/g or more, a phase difference layer having high alignment and suppressed surface unevenness can be formed (Examples 1 to 9).

In particular, from the comparison of Examples 1 to 3, it was found that, in a case of using a polymer compound having the repeating unit (VI) together with the repeating units (I) to (III), surface unevenness can be further suppressed.

In addition, from the comparison of Examples 3 to 5, 8, and 9, it was found that, in a ease of using a polymer compound in which the acid value is 125 mgKOH/g or more and the hydroxyl value is 90 mgKOH/g or more, alignment is further improved.

What is claimed is:

1. A polymer compound comprising:
   a repeating unit represented by Formula (I);
   a repeating unit represented by Formula (II); and
   a repeating unit represented by Formula (III),
   wherein an acid value is 115 mgKOH/g or more,
   a hydroxyl value is 70 mgKOH/g or more, and
   a content of the repeating unit represented by Formula (I) is 35% to 80% by mass with respect to all the repeating units of the polymer compound,

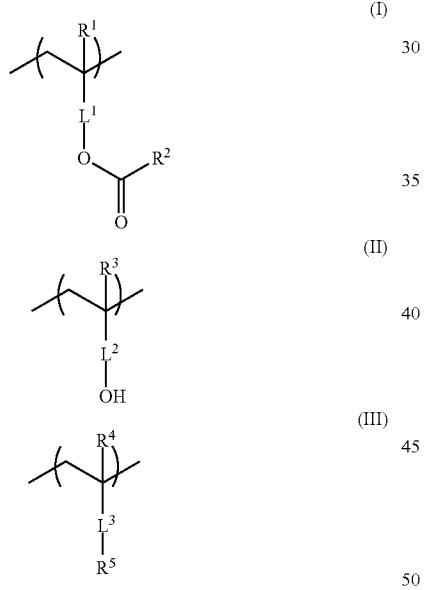

in Formulae (I) to (III), $R^1$, $R^3$, and $R^4$ each independently represent a hydrogen atom or a methyl group, $L^1$, $L^2$, and $L^3$ each independently represent a single bond, or a divalent linking group selected from the group consisting of —O—, —C(=O)—, —(C=O)O—, —(C=O)NR$^6$—, a divalent aliphatic group which may have a substituent, a divalent aromatic group which may have a substituent, and a combination of these groups, $R^6$ represents a hydrogen atom or an alkyl group having 1 to 20 carbon atoms, and $L^1$ and $L^2$ do not represent —O—, in Formula (I), $R^2$ represents an alkyl group having 1 to 20 carbon atoms, and in a case where $R^2$ is an alkyl group having 2 to 20 carbon atoms, one or more of —CH$_2$— constituting the alkyl group may be substituted with —COO— or —CO—, and in Formula (III), $R^5$ represents an alkyl group having 4 to 20 carbon atoms, in which at least one hydrogen atom is substituted with a fluorine atom.

2. The polymer compound according to claim 1, wherein the polymer compound is an acrylic or methacrylic polymer.

3. The polymer compound according to claim 1, wherein the repeating unit represented by Formula (I) has an acetoacetyl group.

4. The polymer compound according to claim 1, wherein the repeating unit represented by Formula (I) is a repeating unit represented by Formula (IV),

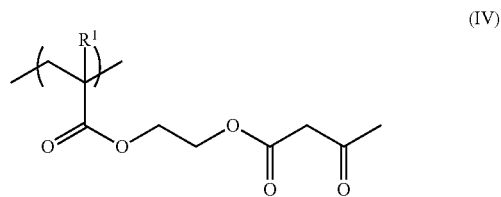

in Formula (IV), $R^1$ represents a hydrogen atom or a methyl group.

5. The polymer compound according to claim 1, wherein $L^2$ in Formula (II) is a divalent linking group selected from the group consisting of —C(=O)—, —(C=O)O—, a divalent aliphatic group which may have a substituent, and a combination of these groups.

6. The polymer compound according to claim 1, wherein $L^2$ in Formula (II) is a divalent linking group which includes a divalent aliphatic group having a hydroxyl group.

7. The polymer compound according to claim 1, wherein the repeating unit represented by Formula (III) is a repeating unit represented by Formula (V),

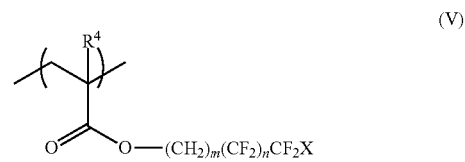

in Formula (V), $R^4$ represents a hydrogen atom or a methyl group, X represents a hydrogen atom or a fluorine atom, m and n each independently represent an integer of 1 to 20, and m+n represents an integer of 4 to 20.

8. The polymer compound according to claim 1, wherein the acid value is 125 mgKOH/g or more, and the hydroxyl value is 90 mgKOH/g or more.

9. The polymer compound according to claim 1, further comprising:
   a repeating unit represented by Formula (VI),

in Formula (VI), $R^7$ represents a hydrogen atom or a methyl group, $R^8$ represents an alkyl group having 1 to 20 carbon atoms, $L^4$ represents a single bond, or a divalent linking group selected from the group consisting of —O—, —C(=O)—, —(C=O)O—, —(C=O)NR$^6$—, a divalent aliphatic group which may have a substituent, a divalent aromatic group which may have a substituent, and a combination of these groups, and $R^6$ represents a hydrogen atom or an alkyl group having 1 to 20 carbon atoms.

10. The polymer compound according to claim 1, wherein a content of the repeating unit represented by Formula (III) is 30% by mass or less with respect to all the repeating units of the polymer compound.

11. The polymer compound according to claim 1, wherein a weight-average molecular weight is 5,000 to 500,000.

12. A liquid crystal composition comprising:
the polymer compound according to claim 1; and
a liquid crystalline compound having a polymerizable group.

13. The liquid crystal composition according to claim 12, further comprising:
a vertical alignment agent.

14. A phase difference layer formed of the liquid crystal composition according to claim 12.

15. An optical film comprising:
the phase difference layer according to claim 14.

16. A polarizing plate comprising:
the optical film according to claim 15.

17. The polarizing plate according to claim 16, further comprising:
a polarizer.

18. An image display device comprising:
the optical film according to claim 15.

19. An image display device comprising:
the polarizing plate according to claim 16.

20. An image display device comprising:
the polarizing plate according to claim 17.

* * * * *